Patented July 16, 1929.

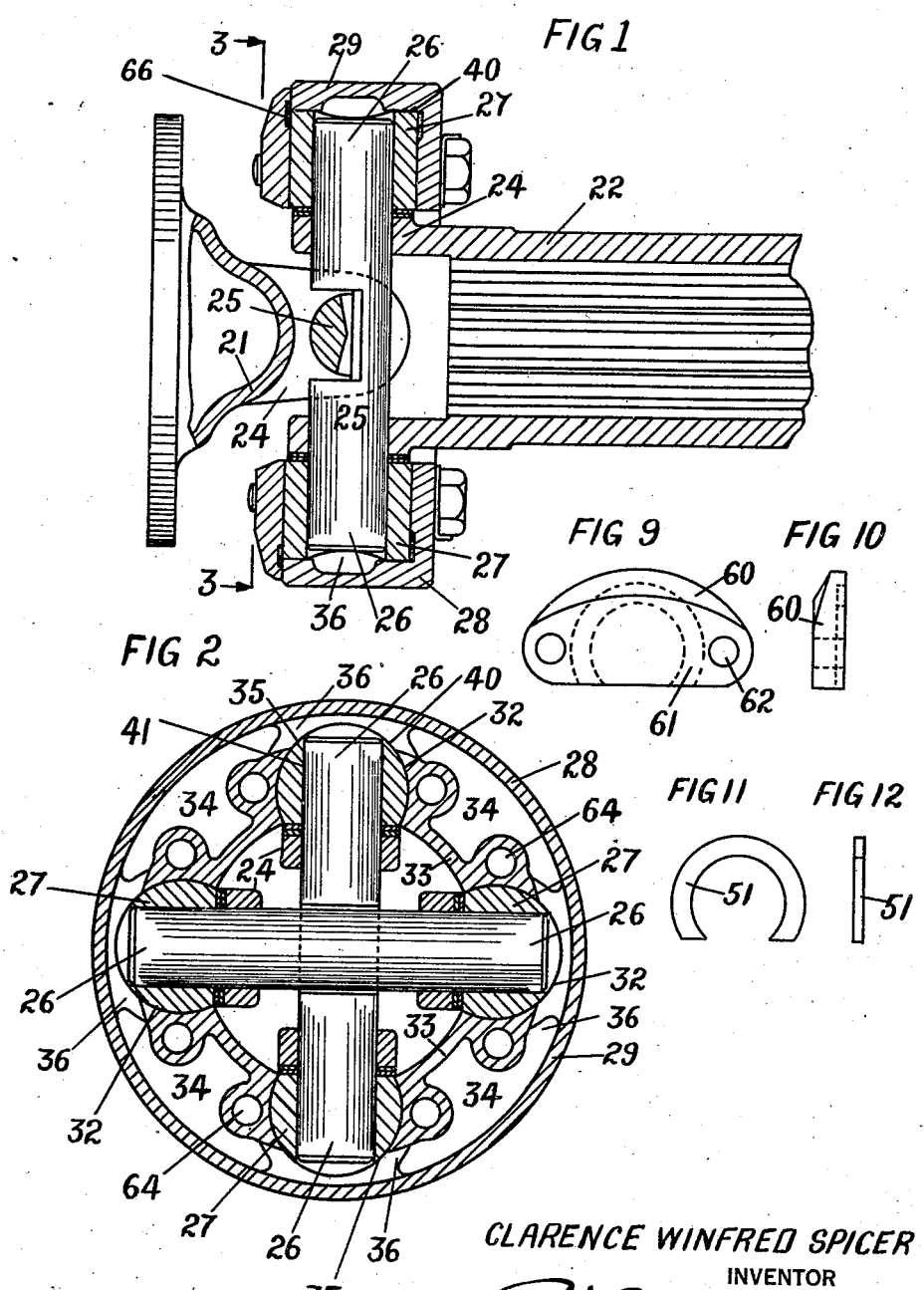

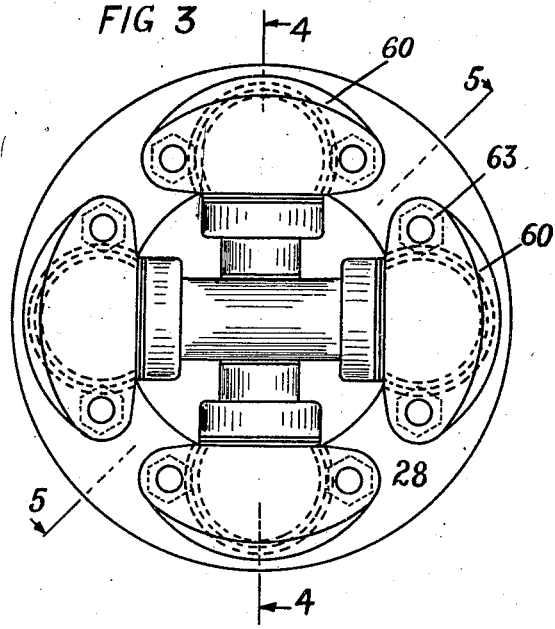
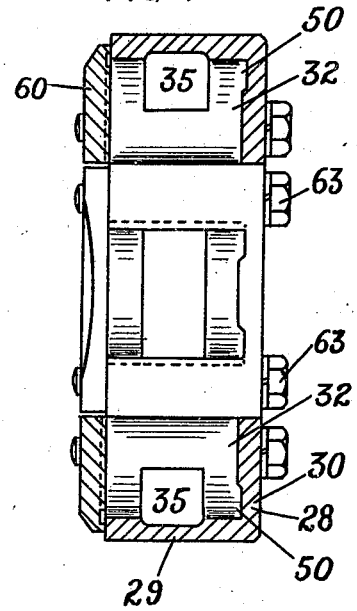
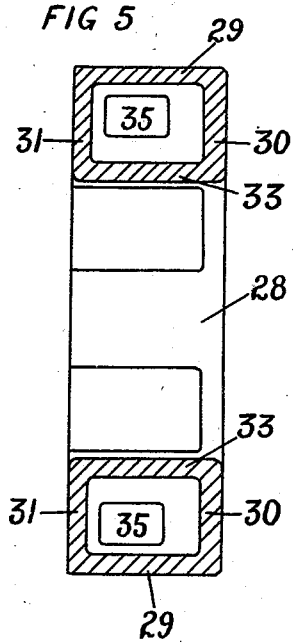
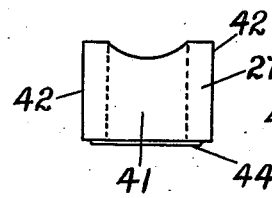
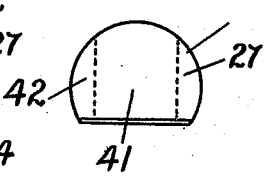
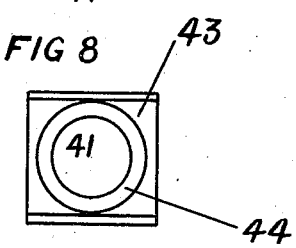

1,721,322

UNITED STATES PATENT OFFICE.

CLARENCE WINFRED SPICER, OF PLAINFIELD, NEW JERSEY, ASSIGNOR TO SPICER MANUFACTURING CORPORATION, A CORPORATION OF VIRGINIA.

UNIVERSAL JOINT.

Application filed February 10, 1927. Serial No. 167,323.

My invention relates to universal joints, and more particularly to joints of the character wherein the trunnions on the end coupling-members are connected with an intermediate hollow lubricant-containing ring through bearing blocks which are inserted in such ring transversely of the latter—that is to say, in a direction that is substantially parallel with the axis of rotation of such ring.

A joint of this general character is shown described and claimed in application 56,642 of Frederick W. Peters and allowed September 20, 1926, which has since matured into Patent Number 1,621,220 said application being assigned to the Spicer Manufacturing Corporation of which the applicant is vice president.

It was discovered that in the construction illustrated and described in the aforesaid patent application that it was impractical commercially to construct the joint with the four bearing blocks of uniform length and the seats to receive the said blocks of uniform depth so that they could be retained in place by means of the clamping ring. With the slightest play in these parts the joint would pound and knock on each reversal of the joint in operation which runs into several thousands per minute and this would destroy the joint in a short time.

One of the objects of this invention is to provide a construction that will compensate any reasonable variations in depth of recess or length of bearing block.

A further object is to provide a fastening means that will withstand the severe stresses and strains of service and one which will independently secure each bearing block in its recess, and one that will be within reasonable cost for production.

The foregoing and other features of my invention will now be described in connection with the accompanying drawings forming part of this specification in which similar characters of reference indicate like parts after which I shall point out in the claims those features which I believe to be new and desire to secure by Letters Patent.

In the drawings:

Figure 1 represents a sectional elevation of a universal joint embodying my invention.

Figure 2 is a central transverse sectional view through the ring showing the pins and trunnions in elevations.

Figure 3 is a view corresponding substantially to the line 3—3 Figure 1.

Figure 4 is a section taken on line 4—4 Figure 3 omitting the pins.

Figure 5 is a sectional view through the ring along the line 5—5 Fig. 3.

Figures 6, 7 and 8 are three views of the trunnion blocks employed.

Figures 9 and 10 are two views of the clamping plate.

Figures 11 and 12 are illustrative of the packing rings.

Describing the various parts by reference characters 21 and 22 denote hubs by means of which the joint is connected to shaft sections (not shown) the hub 22 being shown as adapted for a splined connection with its shaft section. These hubs are provided each with a yoke, the arms 24 of each yoke having a cross pin 25 mounted therein, the outer end 26 thereof constituting trunnions. Each cross pin as shown is provided with a central recess to accommodate rocking movement of the pins. As this construction is unimportant to the present invention it will not be further described suffice it is to provide four trunnions quarteringly disposed for journaling in a hollow ring. The trunnions are adapted to be mounted in bearing blocks carried by and supported within a connecting member 28 in the form of a ring.

The ring 28 is preferably made of malleable iron but it may also be constructed by forging and is provided with an outer cylindrical wall 29 annular side walls 30 and 31 and an inner cylindrical wall 33 the latter being segmental.

Formed in the ring thus provided are transversely extending seats or recesses 32 for the bearing blocks 27. These seats extend through the side wall 31 and toward the opposite side wall 30 and the block receiving wall of each seat is a section of a cylinder having a circumferential extent in excess of 180°, whereby the seats permit the blocks to rock therein while preventing radial inward movement of the said blocks.

It will be noted that the space between the outer wall 29 and the segmental inner wall 33 is divided into a plurality of chambers 34, said chambers being separated from each other by means of the side walls of the seats and by the blocks inserted within the seats. Each chamber 34 is adapted to communicate with the interior of the seats 32 through large openings 35 formed in the walls of said seats thereby to lubricate the outer surfaces of the bearing blocks 27. The chambers 34 are enabled to communicate with each other and to provide for the circulation of the lubricant by centrifugal action, by means of the ports 36 formed in the outer portions of the seats, said ports forming passages, beyond the trunnions, connecting the adjacent chambers 34. The ports 36 merge at their inner ends with the openings 35.

Co-operating with the seats 32 are the bearing blocks 27. These blocks are shaped to fit within the seats, and having an external wall 40 of the same general contour as the wall of its seat, except such contour is modified by the extension of the cylindrical radial bore 41 therethrough. The inner and outer end of the block is plain as shown in Figures 6 and 7 indicated as at 42. The side 43 of the block is provided with a raised annulus 44 which takes the thrust when assembled in the joint.

At the bottom of each seat 32 I provide an annular channel 50 adapted to receive the packing ring 51 shown in Figures 11 and 12. This broken ring is preferably made of cork and is thicker than the depth of the groove or channel 50. Against this packing ring 51 the end 42 of the block rests.

To secure each of these blocks within their seats, I provide individual clamping plates 60 detailed in Figures 9 and 10 having a packing groove or channel 61 on their inner face and provided with holes 62 screw threaded to receive the bolts 63 which pass through the holes 64 provided in the ring 28. These clamping plates are substantially of kidney shape and are designed and proportioned so that the holes 62 are located on a line passing through substantially the center of the block 27, within the groove 61 is provided packing 66 of substantially the same shape as packing 51 but of larger diameter the object of which is to seal the joint at the line between the blocks and their seats. With these individual clamping plates each block can be tightly clamped in its seat regardless of any variation of length due to the manufacturing of the blocks under production methods.

I wish it distinctly understood that my universal joint herein illustrated and described is in the form in which I desire to construct it and that any changes or modification can be made as may be convenient or desirable without departing from the salient features of the invention and I therefore intend the following claims to cover such modifications as naturally fall within the lines of invention.

I claim:

1. A universal joint including a ring having spaced recesses part way through the ring and bearing blocks transversely inserted into said recesses and in contact with the bottom thereof, a separate plate or cover for each bearing block secured to said ring closing the recess and in contact with the end of the bearing block whereby compensations are made for variations in depth of recess or length of bearing block.

2. A universal joint comprising a ring having spaced transversely extended recesses part way through the ring, bearing blocks arranged in said recesses and in contact with the bottom thereof, a separate cap or cover secured to said ring in contact with the end of each bearing block closing the recess whereby each bearing block can be independently secured and any variations in depth of recess or length of bearing block independently accommodated.

3. A universal joint including a ring having spaced recesses part way through the ring and bearing blocks in contact with the bottom thereof transversely inserted into said recesses and a separate plate or cover for each bearing block secured to said ring and contacting with the end of said block, closing the recess, a packing recess in said cap, and packing within said recess to cover the junction of the block and its recess.

4. The device of claim 1, in which the caps are secured to the ring by bolts passing transversely through the ring and tapping into the caps.

5. The device of claim 1, in which the caps are kidney shaped providing means for attachment of said cap.

Dated this 25th day of January, 1927.

CLARENCE WINFRED SPICER.